United States Patent
Gonciulea et al.

(10) Patent No.: US 12,468,538 B2
(45) Date of Patent: Nov. 11, 2025

(54) SYSTEMS AND METHODS FOR OPTIMIZED QUANTUM SEARCHING

(71) Applicant: JPMORGAN CHASE BANK, N.A., New York, NY (US)

(72) Inventors: Constantin Gonciulea, Upper Arlington, OH (US); Austin Gilliam, Columbus, OH (US); Marco Pistoia, Amawalk, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 1219 days.

(21) Appl. No.: 17/318,336

(22) Filed: May 12, 2021

(65) Prior Publication Data

US 2021/0357229 A1    Nov. 18, 2021

Related U.S. Application Data

(60) Provisional application No. 63/023,744, filed on May 12, 2020.

(51) Int. Cl.
*G06N 10/80* (2022.01)
*G06F 9/38* (2018.01)
*G06N 10/20* (2022.01)
*G06N 10/60* (2022.01)

(52) U.S. Cl.
CPC ........... *G06F 9/3836* (2013.01); *G06N 10/20* (2022.01); *G06N 10/60* (2022.01); *G06N 10/80* (2022.01)

(58) Field of Classification Search
CPC ...... G06F 9/3836; G06N 10/20; G06N 10/60; G06N 10/80
See application file for complete search history.

(56) References Cited

U.S. PATENT DOCUMENTS

| | | | |
|---|---|---|---|
| 2019/0205783 A1* | 7/2019 | Nam | G06F 17/14 |
| 2019/0220782 A1* | 7/2019 | Chen | G06N 10/20 |
| 2020/0285985 A1* | 9/2020 | Javadiabhari | G06N 10/80 |
| 2020/0372388 A1* | 11/2020 | da Silva Júnior | G06F 17/18 |

* cited by examiner

*Primary Examiner* — Marshall L Werner
(74) *Attorney, Agent, or Firm* — GREENBERG TRAURIG LLP (57) ABSTRACT

A method for optimized quantum searching may include: creating, by a classical computer program, a quantum circuit that implements Grover's algorithm; identifying, by the classical computer program in a pre-transpile step, instances of Hadamard gates (H gates) and Pauli X-gates (X gates) and instances of X gates and H gates in the quantum circuit; replacing, by the classical computer program, the instances of the H gates and X gates with Rx(π/2) gates and the instances of the X gates and H gates with Rx(-π/2) gates; implementing, by the classical computer program, a plurality of gates that implement a reflection about the mean in the quantum circuit; completing, by the classical computer program, transpiling the quantum circuit into a plurality of quantum instructions; sending, by the classical computer program, the quantum instructions to a quantum computer; and receiving, from the quantum computer, results of execution of the quantum instructions.

18 Claims, 5 Drawing Sheets

SYSTEMS AND METHODS FOR OPTIMIZED QUANTUM SEARCHING

RELATED APPLICATIONS

This application claims priority to, and the benefit of, U.S. Provisional Patent Application Ser. No. 63/023,744, filed May 12, 2020, the disclosure of which is hereby incorporated, by reference, in its entirety.

BACKGROUND OF THE INVENTION

1. Field of the Invention

Embodiments relate generally to systems and methods for optimized quantum searching.

2. Description of the Related Art

Grover's Search Algorithm is a basic Quantum Computing concept. Essentially there are three steps, with the last two repeated a number of times before measuring: (1) create a superposition of the outcomes in the search space; (2) flag the outcomes of interest using an oracle that multiplies the amplitude of these outcomes by −1 (geometrically this is a reflection in the space of the "bad" states); and (3) the amplification step, performing inversion around the mean (geometrically this is a reflection around the whole state), and it has 3 sub steps: undo the superposition, multiply the amplitude of $|0 \ldots 0\rangle$ by −1, and then redo the superposition.

An example of a Grover's search circuit that performs the search for 2 using n=2 qubits.

In order to amplify the amplitude of the outcomes of interest, the Grover Iterate is executed a number of times. The iterate is also used in the Amplitude Estimation procedure, making its efficient implementation quite important.

SUMMARY OF THE INVENTION

Systems and methods for optimized quantum searching are disclosed. According to one embodiment, a method for optimized quantum searching may include: (1) creating, by a classical computer program executed by a computer processor, a quantum circuit that implements Grover's algorithm; (2) identifying, by the classical computer program in a pre-transpile step, instances of Hadamard gates (H gates) and Pauli X-gates (X gates) and instances of X gates and H gates in the quantum circuit; (3) replacing, by the classical computer program, the instances of the H gates and X gates with $Rx(\pi/2)$ gates and the instances of the X gates and H gates with $Rx(-\pi/2)$ gates; (4) implementing, by the classical computer program, a plurality of gates that implement a reflection about the mean in the quantum circuit; (5) completing, by the classical computer program, transpiling the quantum circuit into a plurality of quantum instructions; (6) sending, by the classical computer program, the quantum instructions to a quantum computer; and (7) receiving, from the quantum computer, results of execution of the quantum instructions.

In one embodiment, the method may further include graphically outputting, by the classical computer program, the results of the execution of the quantum instructions. The classical computer program may output the results as a histogram.

In one embodiment, the reflection about the mean in the quantum circuit may be implemented by including a plurality of gates to flip a sign of an all-ones state.

In one embodiment, the method may further include analyzing, by the classical computer program, the results of the execution of the quantum instructions.

In one embodiment, the quantum computer may be a Noisy Intermediate-Scale Quantum (NISQ) computer.

According to another embodiment, an electronic device may include: a memory storing a classical computer program; and a computer processor. The classical computer program may be configured to: (1) create a quantum circuit that implements Grover's algorithm; (2) identify, in a pre-transpile step, instances of Hadamard gates (H gates) and Pauli X-gates (X gates) and instances of X gates and H gates in the quantum circuit; (3) replace the instances of the H gates and X gates with $Rx(\pi/2)$ gates and the instances of the X gates and H gates with $Rx(-\pi/2)$ gates; (4) implement a plurality of gates that implement a reflection about the mean in the quantum circuit; (5) complete transpiling the quantum circuit into a plurality of quantum instructions; (6) send the quantum instructions to a quantum computer; and (7) receive results of execution of the quantum instructions from the quantum computer.

In one embodiment, the classical computer program may be further configured to graphically output the results of the execution of the quantum instructions. The classical computer program may output the results as a histogram.

In one embodiment, the classical computer program may implement the reflection about the mean in the quantum circuit by including a plurality of gates to flip a sign of an all-ones state.

In one embodiment, the classical computer program may be further configured to analyze the results of the execution of the quantum instructions.

According to another embodiment, a system may include: an electronic device comprising a memory storing a classical computer program and a computer processor; and a quantum computer in communication with the electronic device. The classical computer program may be configured to: create a quantum circuit that implements Grover's algorithm; identify, in a pre-transpile step, instances of Hadamard gates (H gates) and Pauli X-gates (X gates) and instances of X gates and H gates in the quantum circuit; replace the instances of the H gates and X gates with $Rx(\pi/2)$ gates and the instances of the X gates and H gates with $Rx(-\pi/2)$ gates; implement a plurality of gates that implement a reflection about the mean in the quantum circuit; complete transpiling the quantum circuit into a plurality of quantum instructions; and send the quantum instructions to a quantum computer. The quantum computer may configured to execute the quantum instructions and output results to the classical computer program. The classical computer program may be configured to graphically output the results of the execution of the quantum instructions.

In one embodiment, the electronic device may be a classical computer.

In one embodiment, the quantum computer may be a Noisy Intermediate-Scale Quantum (NISQ) computer.

In one embodiment, the classical computer program may be further configured to graphically output the results of the execution of the quantum instructions. The classical computer program may output the results as a histogram.

In one embodiment, the classical computer program may implement the reflection about the mean in the quantum circuit by including a plurality of gates to flip a sign of an all-ones state.

In one embodiment, the classical computer program may be further configured to analyze the results of the execution of the quantum instructions.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 2:
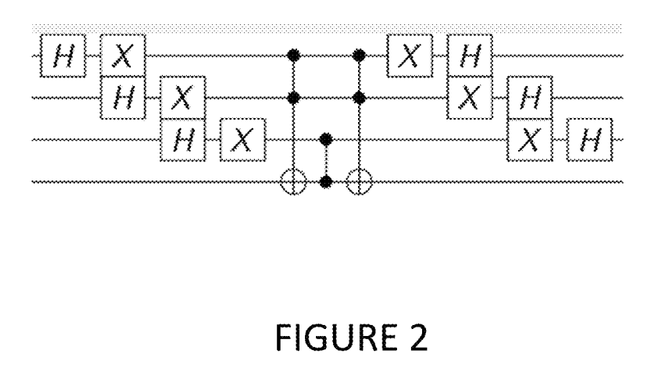
FIG. 2 depicts a quantum circuit with H X and X H gates.
Figure 3:
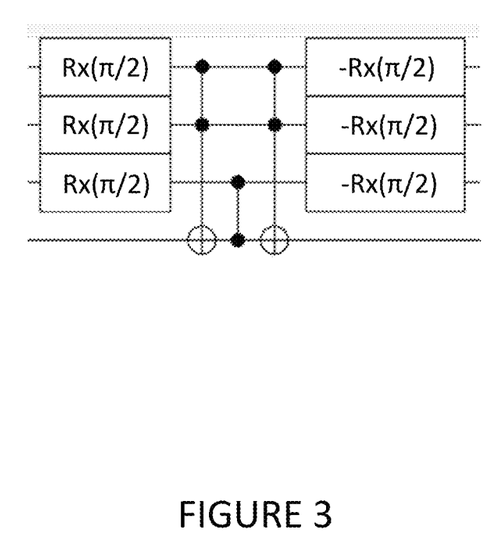
FIG. 3 depicts quantum circuit of FIG. 2 modified according to an embodiment.

Embodiments are directed to systems and methods for optimized quantum searching. Specifically, Grover's Search Algorithm may be implemented with a fewer number of gates, such as by replacing sequential H and X gates with a $Rx(\pi/2)$ gate. Embodiments do not undo the superposition to go back to the $|0 \ldots 0\rangle$ state in the amplification step. Instead, embodiments go to another state, e.g., $|1 \ldots 1\rangle$ in order to implement the inversion about the mean. For example, embodiments replace the H X gates in the circuit of FIG. 2 with a $Rx(\pi/2)$ gate in the circuit FIG. 3.

Figure 4:
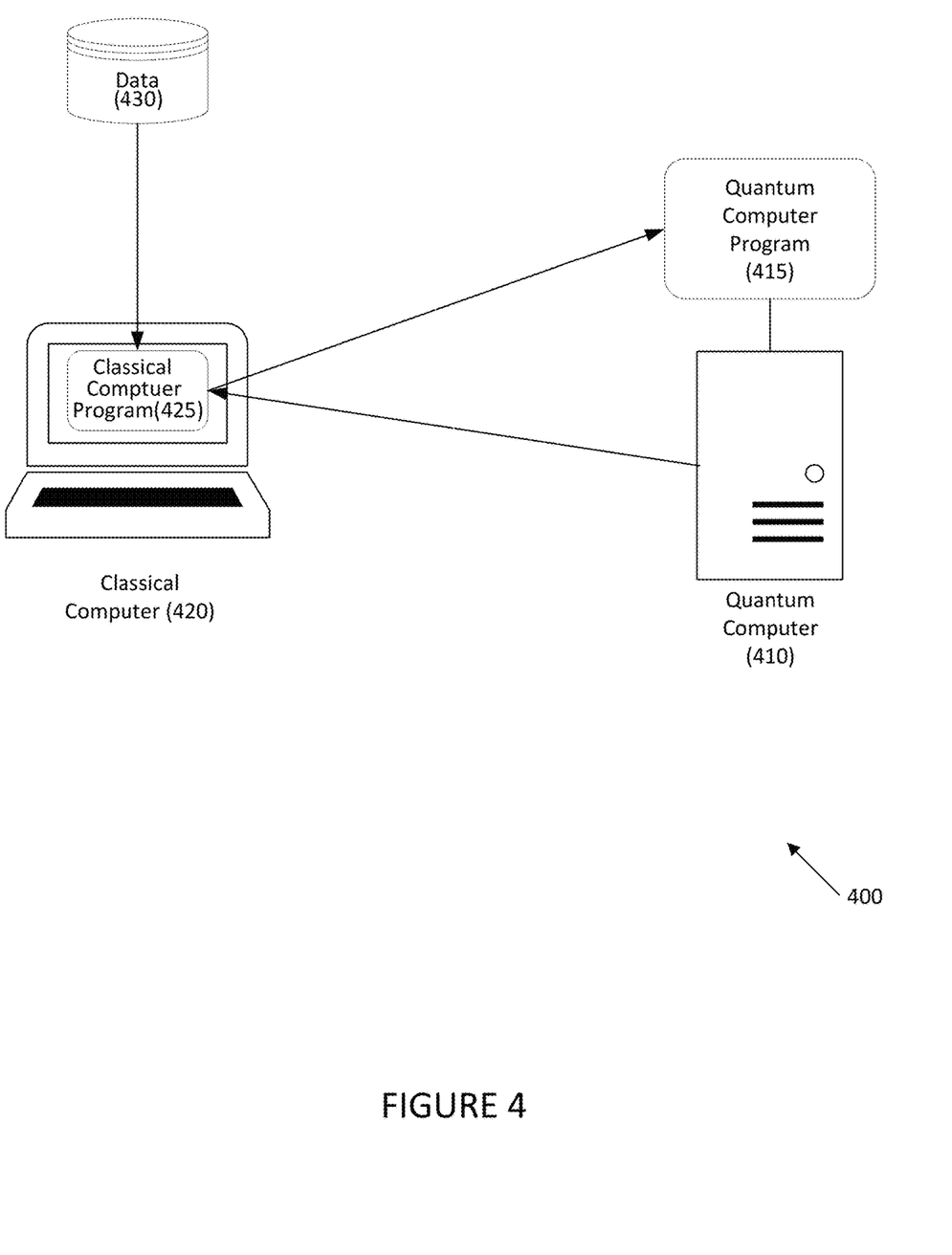
FIG. 4 depicts a system for optimized quantum searching according to one embodiment.

Referring to FIG. 4, a system for optimized quantum searching is disclosed. System 400 may include quantum computer 410 that may execute quantum computer program 415. Classical computer 420 may interface with quantum computer program 415 using classical computer program 425. Classical computer 420 may be any suitable classical computing device, including servers, workstations, desktop, notebook, laptop, or tablet computers, etc.

Quantum computer 410 may be a Noisy Intermediate-Scale Quantum (NISQ) computer.

Quantum computer 410 may be a Noisy Intermediate-Scale Quantum (NISQ) computer. For example, IBM quantum computers may compile to "X90s" (essentially $Rx(\pi/2)$) and a phase gate. With other quantum computers, other patterns that compile to a primitive may be used.

Classical computer program 425 may provide input to, and receive output from, quantum computer 410 and/or quantum computer program 415. In one embodiment, classical computer program 425 may provide generate quantum computer program 415, such as a quantum circuit, and may provide quantum computer program 415 to quantum computer 410. Classical computer program 425 may receive the results of the execution of quantum computer program 415.

Database 430 may be a source of data that may be used to searched. For example, classical data may be loaded into the quantum state from database 430, and then the data may searched.

In one embodiment, classical computer program 425 may create a quantum circuit that implements Grover's algorithm, and prior to transpiling the quantum circuit, classical computer program 425 may replace instances of Hadamard (H) gates and Pauli X-gates in the quantum circuit with $R(\pi/2)$ gates, and X H gates with $R(-\pi/2)$ gates. This decreases the number of gates required to describe the operation, which leads to performance improvements in NISQ computers.

Classical computer program 425 may then finish transpiling the quantum circuit and may then send it to the quantum computer for execution. Classical computer program 425 may receive the results from the quantum computer.

Figure 5:
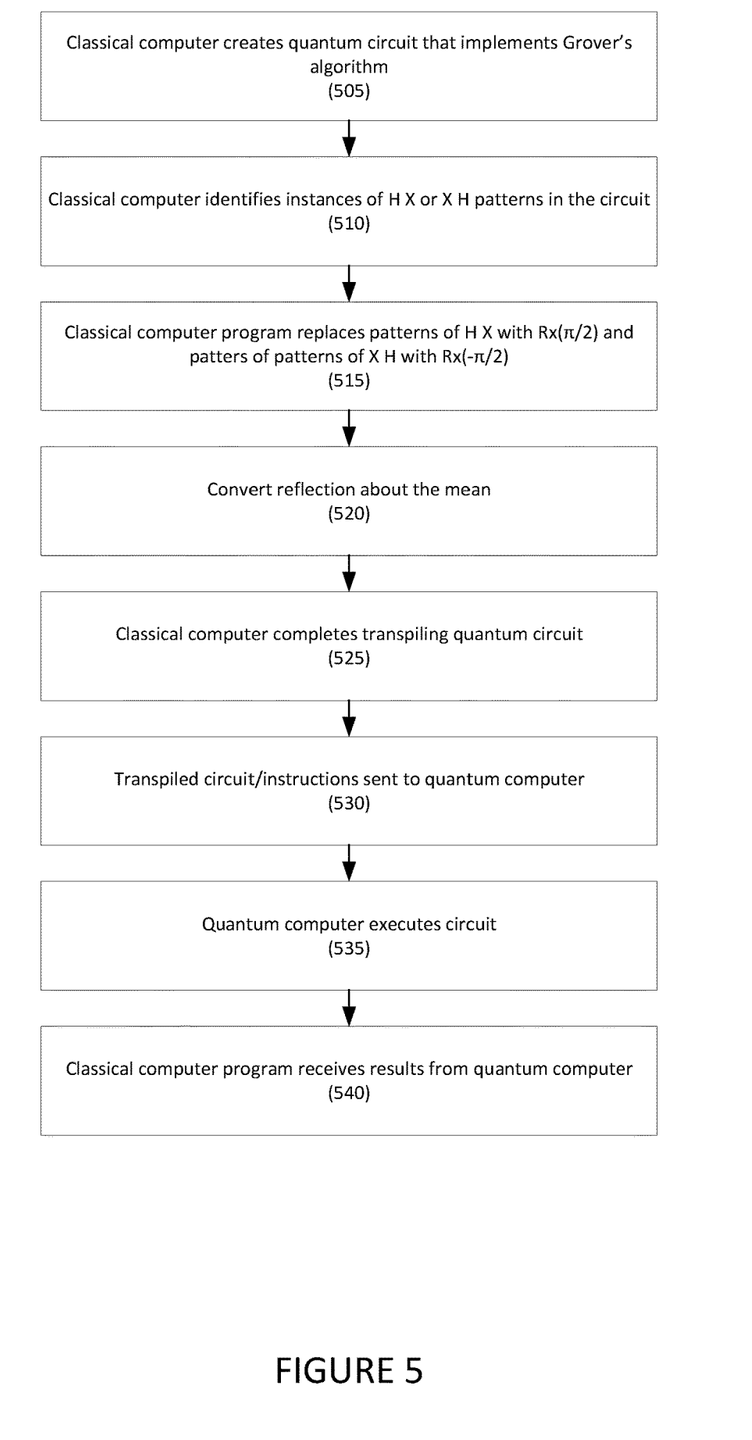
FIG. 5 depicts a method for optimized quantum searching according to one embodiment.

Referring to FIG. 5, a method for optimized quantum searching is disclosed according to an embodiment. In step 505, a classical computer program may create a quantum circuit that implements Grover's algorithm.

In step 510, in pre-transpile step, the classical computer program may identify instances of H X and X H gates in the quantum circuit.

In step 515, the classical computer program may replace instances of H X gates with $Rx(\pi/2)$ gates, and instances of X H with $Rx(-\pi/2)$ gates.

Depending on the platform, instances of H X gates and instances of X H may be replaced with different primitives or gates as is necessary and/or desired.

In step 520, the classical computer program may identify gates that correspond to a reflection about the mean, specifically by flipping the sign of the all-zeros state, and adapting the circuit such that it flips the sign of the all-ones state instead. In one embodiment, the classical computer program may include a plurality of gates to implement the reflection about the mean.

In step 525, the classical computer program may then continue transpiling the quantum circuit, which results in the lowest-level instructions that the quantum computer will accept. In step 530, the classical computer program may then send the instructions to the quantum computer. In step 535, the quantum computer may execute the instructions, and in step 540, the classical computer program may receive the results. In one embodiment, the classical computer program may output the results visually, and may perform analysis.

For example, the results received from the quantum computer may be returned a dictionary (i.e., the classical computer science structure) of what outcome was measured (a binary string, which is the key of the dictionary), and how many times that outcome was measured (an integer, which is the value of the dictionary). The outcome(s) of the search will be measured more times than others, and the output may be presented visually as a histogram.

Figure 1:
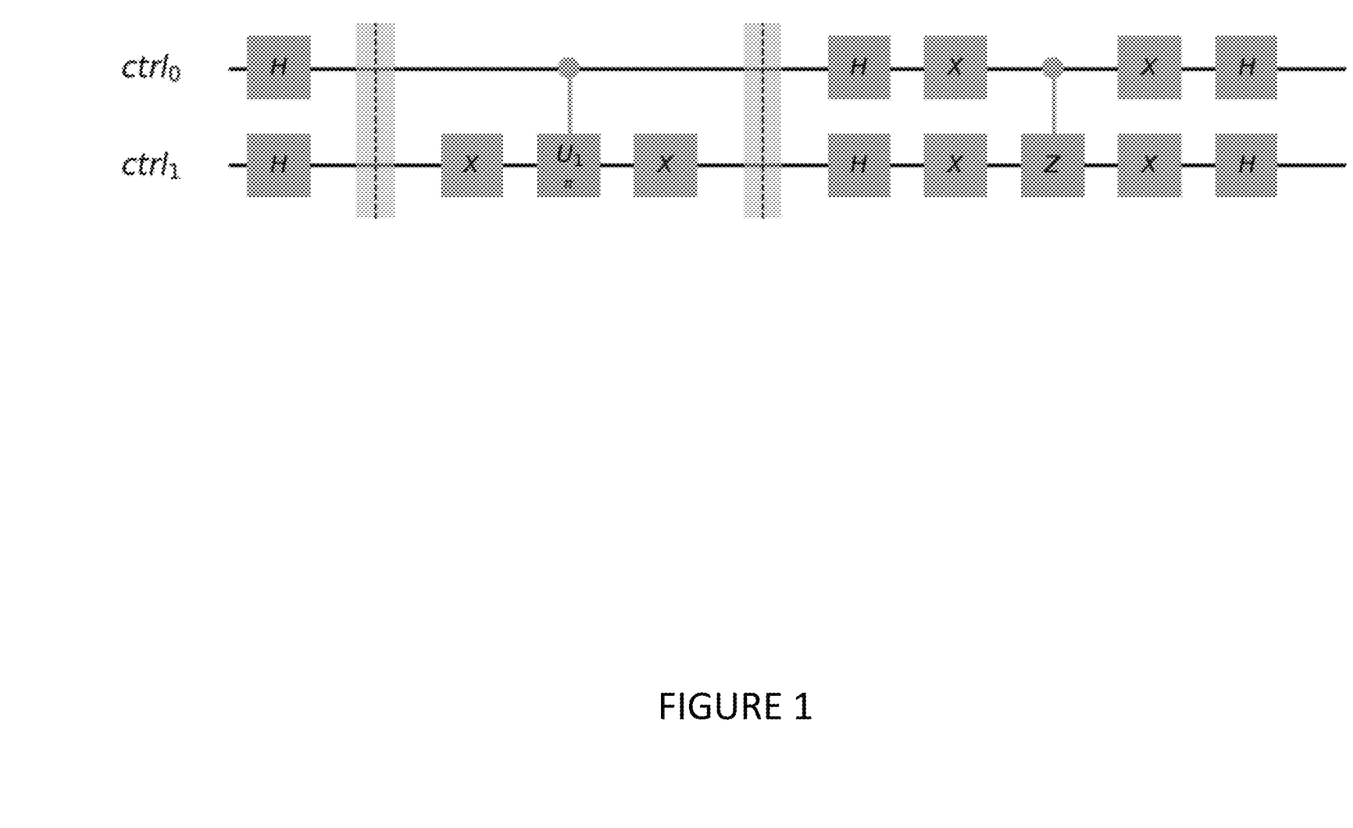
FIG. 1 depicts an example of a Grover's search quantum circuit that searches for the value 2.
Figure 6:
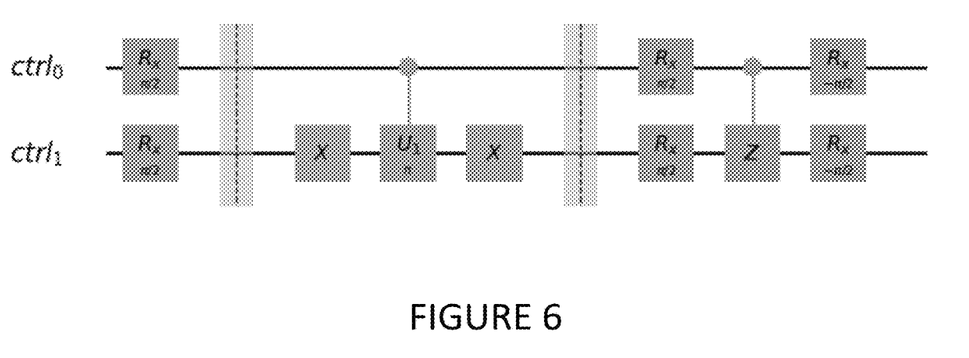
FIG. 6 depicts the quantum circuit of FIG. 1 modified according to an embodiment.

FIG. 6 depicts an example of the quantum circuit of FIG. 1 with the H X and X H gates replaced according to embodiments.

The disclosure of Gilliam et al., "Optimizing Quantum Search using a Generalized Version of Grover's Algorithm" (2020), available at https://arxiv.org/abs/2005.06468 is hereby incorporated, by reference, in its entirety.

Embodiments may lead to more optimal realizations of quantum search. There are multiple benefits that derive from this invention, as Grover Search is a quantum algorithm that can serve as a building block in many quantum algorithms, leading to quadratic speedup.

Although several embodiments have been disclosed, it should be recognized that these embodiments are not exclusive to each other, and certain elements or features from one embodiment may be used with another.

Hereinafter, general aspects of implementation of the systems and methods of the invention will be described.

The system of the invention or portions of the system of the invention may be in the form of a "processing machine,"

such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

In one embodiment, the processing machine may be a classical computer, a quantum computer, etc.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, a memory stick, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for optimized quantum searching, comprising:
    creating, by a classical computer program executed by a computer processor, a quantum circuit that implements Grover's algorithm;
    identifying, by the classical computer program in a pre-transpile step, instances of Hadamard gates (H gates) and Pauli X-gates (X gates) and instances of X gates and H gates in the quantum circuit;
    replacing, by the classical computer program, the instances of the H gates and X gates with $Rx(\pi/2)$ gates and the instances of the X gates and H gates with $Rx(-\pi/2)$ gates, wherein a number of the instances of the H gates and X gates, and the instances of the X gates and the H gates is greater than a number of $Rx(\pi/2)$ gates and $Rx(-\pi/2)$ gates;
    implementing, by the classical computer program, a plurality of gates that implement a reflection about the mean in the quantum circuit;
    completing, by the classical computer program, transpiling the quantum circuit into a plurality of quantum instructions;
    sending, by the classical computer program, the quantum instructions to a quantum computer, wherein the quantum computer is configured to execute the quantum instructions and implement the reflection about the mean without undoing superposition in an amplification step of Grover's algorithm; and
    receiving, from the quantum computer, results of execution of the quantum instructions.

2. The method of claim 1, further comprising:
    graphically outputting, by the classical computer program, the results of the execution of the quantum instructions.

3. The method of claim 2, wherein the classical computer program outputs the results as a histogram.

4. The method of claim 1, wherein the reflection about the mean in the quantum circuit is implemented by including a plurality of gates to flip a sign of an all-ones state.

5. The method of claim 1, further comprising:
    analyzing, by the classical computer program, the results of the execution of the quantum instructions.

6. The method of claim 1, wherein the quantum computer comprises a Noisy Intermediate-Scale Quantum (NISQ) computer.

7. An electronic device comprising:
    a memory storing a classical computer program; and
    a computer processor;
    wherein the classical computer program is configured to:
        create a quantum circuit that implements Grover's algorithm;
        identify, in a pre-transpile step, instances of Hadamard gates (H gates) and Pauli X-gates (X gates) and instances of X gates and H gates in the quantum circuit;
        replace the instances of the H gates and X gates with $Rx(\pi/2)$ gates and the instances of the X gates and H gates with $Rx(-\pi/2)$ gates, wherein a number of the instances of the H gates and X gates, and the instances of the X gates and the H gates is greater than a number of $Rx(\pi/2)$ gates and $Rx(-\pi/2)$ gates;
        implement a plurality of gates that implement a reflection about the mean in the quantum circuit;
        complete transpiling the quantum circuit into a plurality of quantum instructions;
        send the quantum instructions to a quantum computer, wherein the quantum computer is configured to execute the quantum instructions and implement the reflection about the mean without undoing superposition in an amplification step of Grover's algorithm; and receive results of execution of the quantum instructions from the quantum computer.

8. The electronic device of claim 7, wherein the classical computer program is further configured to graphically output the results of the execution of the quantum instructions.

9. The electronic device of claim 8, wherein the classical computer program outputs the results as a histogram.

10. The electronic device of claim 7, wherein the classical computer program implements the reflection about the mean in the quantum circuit by including a plurality of gates to flip a sign of an all-ones state.

11. The electronic device of claim 7, wherein the classical computer program is further configured to analyze the results of the execution of the quantum instructions.

12. A system, comprising:
an electronic device comprising a memory storing a classical computer program and a computer processor; and
a quantum computer in communication with the electronic device;
wherein:
the classical computer program is configured to create a quantum circuit that implements Grover's algorithm;
the classical computer program is configured to identify, in a pre-transpile step, instances of Hadamard gates (H gates) and Pauli X-gates (X gates) and instances of X gates and H gates in the quantum circuit;
the classical computer program is configured to replace the instances of the H gates and X gates with $Rx(\pi/2)$ gates and the instances of the X gates and H gates with $Rx(-\pi/2)$ gates, wherein a number of the instances of the H gates and X gates, and the instances of the X gates and the H gates is greater than a number of $Rx(\pi/2)$ gates and $Rx(-\pi/2)$ gates;
the classical computer program is configured to implement a plurality of gates that implement a reflection about the mean in the quantum circuit;
the classical computer program is configured to complete transpiling the quantum circuit into a plurality of quantum instructions;
the classical computer program is configured to send the quantum instructions to a quantum computer;
the quantum computer is configured to execute the quantum instructions and implement the reflection about the mean without undoing superposition in an amplification step of Grover's algorithm, and to output results to the classical computer program; and
the classical computer program is configured to graphically output the results of the execution of the quantum instructions.

13. The system of claim 12, wherein the electronic device comprises a classical computer.

14. The system of claim 12, wherein the quantum computer comprises a Noisy Intermediate-Scale Quantum (NISQ) computer.

15. The system of claim 12, wherein the classical computer program is further configured to graphically output the results of the execution of the quantum instructions.

16. The system of claim 15, wherein the classical computer program outputs the results as a histogram.

17. The system of claim 12, wherein the classical computer program implements the reflection about the mean in the quantum circuit by including a plurality of gates to flip a sign of an all-ones state.

18. The system of claim 12, wherein the classical computer program is further configured to analyze the results of the execution of the quantum instructions.

* * * * *